Sept. 6, 1938.  S. RUBENSTEIN ET AL  2,129,538
KNIFE GRINDING ATTACHMENT
Filed Feb. 26, 1936

INVENTOR.
Harry Amazon and
BY Samuel Rubenstein
Irving F. Goodfriend
ATTORNEY.

Patented Sept. 6, 1938

2,129,538

UNITED STATES PATENT OFFICE 2,129,538

KNIFE GRINDING ATTACHMENT

Samuel Rubenstein and Harry Amazon, New York, N. Y., assignors of one-third to Meyer Levine, Brooklyn, N. Y.

Application February 26, 1936, Serial No. 65,743

1 Claim. (Cl. 51—166)

This invention relates to a knife grinder or sharpener attachment and more particularly to such a device which can be readily and expeditiously connected to the housing and motor drive shaft of the conventional meat grinder available in all butcher shops and the like.

Proprietors of such shops have heretofore required the use of knife sharpeners or grinders actuated by its own power plant.

Our invention contemplates the provision of a knife sharpener or grinder which may be readily and expeditiously applied to or disconnected from the drive shaft and housing of a conventional meat grinder to thereby utilize the power thereof to rotate the grindstone or the like.

Our invention further contemplates the provision of such a device which is comparatively inexpensive in construction, simple, compact, and light in weight but yet strong and durable under the most exacting service conditions.

Other objects of our invention will be clear from the description which follows and from the drawing in which Fig. 1 is an elevational view of our knife sharpening attachment attached to the housing and drive shaft of a conventional meat grinder.

Figure 1:
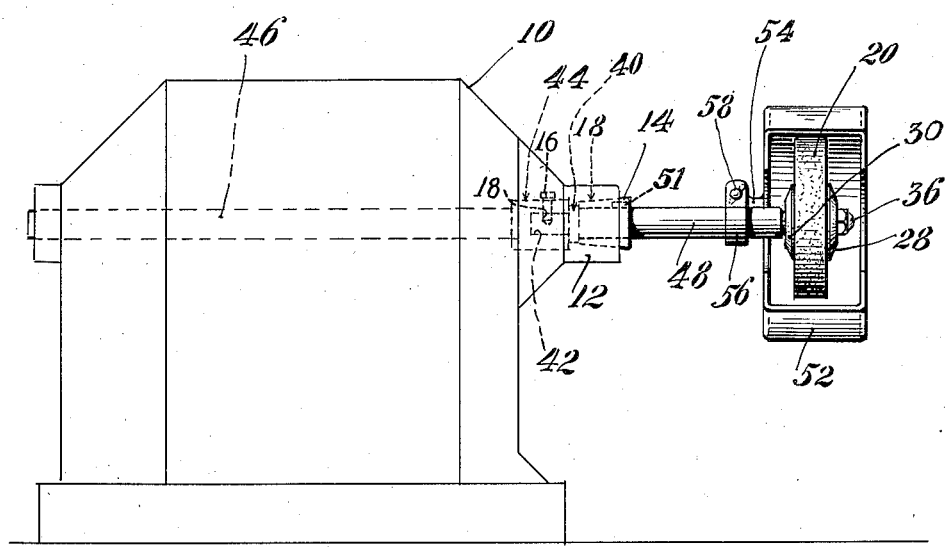
Figure 4:
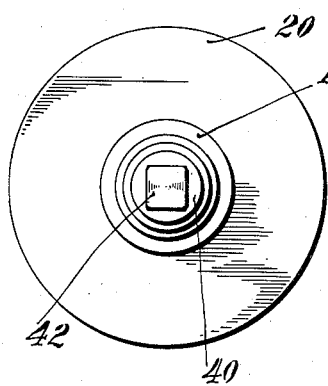
Fig. 4 is an elevational view of our knife sharpener attachment looking toward the connecting spindle.
Figure 3:
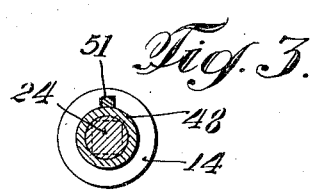
Fig. 3 is a cross sectional view taken along the line 3—3 of Fig. 2.
Figure 2:
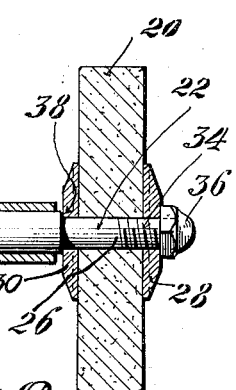
Fig. 2 is a partial cross sectional and side view of our knife sharpener attachment.

Referring now to the drawing, in order to apply our knife sharpener attachment to a conventional meat grinder housing 10, the usual feed pan and chopper end, which need not be shown or described here, are first removed from the horizontally extending socket 12 and are replaced therein by our knife sharpener attachment.

Such sockets are conventionally provided with an inwardly tapered bore and we therefore provide, in the preferred embodiment of our invention, a correspondingly tapered connecting collar 14 which is forced into the socket in frictional engagement therewith and secured thereto by the threaded wing lock nut 16, arranged in the correspondingly threaded aperture 18 on the socket, to thereby secure our attachment on the housing.

A grindstone or knife sharpener 20 is detachably arranged on the grindstone spindle 22 extending from the driven shaft 24.

The grindstone is provided with a bore 26 which receives the spindle with a frictional fit and is held on the spindle between the lock washers 28 and 30.

In order to operatively secure the grindstone between the washers, the spindle is provided with a threaded end 34 which receives the grindstone lock nut 36.

The driven shaft is provided with a shoulder 38 against which the washer 26 is forced by the lock nut as it is screwed on the spindle to thereby lock the grindstone in position between the washers.

The driven shaft is provided at the opposed end with the annular shoulder 40 against which the tapered connecting collar may rest.

Extending from the annular shoulder we arrange a square connecting spindle 42, which is arranged to be received by the conventional square union socket 44 conventionally provided on the motor drive shaft 46.

Upon securing the attachment to the housing in the manner described above, the square connecting spindle need only be aligned with the correspondingly square union socket and fitted therein to thereby provide a driving clutch.

The drive shafts of conventional meat grinders rotate at comparatively low speeds which are in the neighborhood of three hundred revolutions per minute.

We have found it desirable that the driven shaft of an attachment of the type contemplated by our invention be of a comparatively extended dimension in order that the grindstone may adequately clear the meat grinder housing.

In order to provide a bearing that will, in such circumstances, adequately withstand the excessive strains placed thereon by the weight of a grindstone slung on such an extended driven shaft, the grinding forces placed thereon and operating at such comparatively low speeds, we arranged in the tapered collar the extended horizontal tubular bearing 48 which is pressed to fit into the collar bore 50, which may be secured against relative rotation in any suitable manner, such as by the cooperating key and keyway 51.

The driven shaft is journaled in this tubular bearing and operatively rests thereon throughout its length. We have found that such an extended driven shaft bearing overcomes the difficulties of excessive wear, breakdown and inefficient operation encountered with bearings heretofore used in attachments of this type.

Our resulting device is comparatively inexpensive to manufacture, simple to construct and yet provides a structure which will efficiently operate and withstand the hard usage to which it is subjected.

In order to provide means for oiling the bearing we arrange an oil hole 53 intermediate the ends of the extended tubular bearing. Oil directed into this opening will flow throughout the extension of the bearing to thereby keep it well lubricated.

In order to collect grit and particles attendant upon the grinding operation and thereby prevent such foreign matter from reaching any food which may be adjacent the machine or from reaching the machine itself, a dust hood 52 may be arranged on our attachment to enclose the grindstone.

Arms 54 extend from the hood and terminate in a resilient collar 56, which is detachably arranged on the bearing and secured thereto by the lock nut 58.

Figure 5:
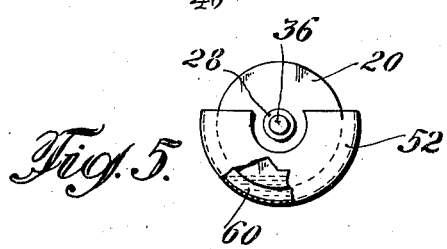
Fig. 5 is an end view of the dust hood in rotated position to receive water therein.

It will be apparent that our attachment may be converted into a wet type grindstone, by rotating the hood about the bearing into a horizontal position (Fig. 5), whereby it is adapted to receive and carry a supply of water 60 in which the grindstone may rotate.

The lock nut 58 permits the hood to be rotated about the bearing and to be secured in any selected position thereon.

It will be apparent that we have provided a knife sharpener attachment which is extremely simple in construction, comparatively inexpensive to manufacture and which may be readily and easily applied to conventional meat grinders found in butcher shops and the like and which will withstand the hard usage to which it is subjected.

It will be further apparent that such a device will be found desirable in butcher shops and the like since it provides an inexpensive means for conveniently sharpening butcher knives and like implements.

We claim:

The combination with a meat grinder, having a horizontal drive shaft extending therethrough provided with a terminating square connecting socket, of a knife sharpener comprising a horizontally extended shaft coaxial with the drive shaft and having a terminal square connecting spindle integral therewith for insertion into the socket of the drive shaft, an annular shoulder adjacent the spindle and an opposed terminal restricted threaded portion, a grindstone mounted on the threaded portion of the shaft, means in engagement with the threaded end of the latter shaft to retain the grindstone in fixed position, a tubular bearing journaled to the latter shaft and extending the length of the same intermediate the grindstone and the annular shoulder, and a tapered collar member secured to the bearing abutting the shoulder forming operative frictional engagement with the socket of the drive shaft.

SAMUEL RUBENSTEIN.
        HARRY AMAZON.